(12) United States Patent
Nomura et al.

(10) Patent No.: US 7,467,562 B2
(45) Date of Patent: Dec. 23, 2008

(54) VEHICULAR TRANSMISSION

(75) Inventors: Takashi Nomura, Saitama (JP); Yoshiaki Hori, Saitama (JP); Seiji Hamaoka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 324 days.

(21) Appl. No.: 11/394,170

(22) Filed: Mar. 30, 2006

(65) Prior Publication Data

US 2006/0219035 A1 Oct. 5, 2006

(30) Foreign Application Priority Data

Mar. 31, 2005 (JP) ............................. 2005-101034

(51) Int. Cl.
*F16H 3/08* (2006.01)
(52) U.S. Cl. ............................. 74/331; 74/329; 74/330; 74/333; 74/339; 74/409; 74/411
(58) Field of Classification Search .................. 74/325, 74/329, 330, 331, 333, 339, 340, 411, 409, 74/440, 443; 464/51, 183
See application file for complete search history.

(56) References Cited

U.S. PATENT DOCUMENTS

| | | | | |
|---|---|---|---|---|
| 4,038,882 A | * | 8/1977 | Keller | .......................... 74/331 |
| 4,226,135 A | * | 10/1980 | Winter | .......................... 74/330 |
| 4,848,177 A | * | 7/1989 | Miura et al. | .................. 74/467 |
| 5,421,216 A | * | 6/1995 | Stine | ............................ 74/331 |
| 7,231,843 B2 | * | 6/2007 | Gumpoltsberger et al. | .... 74/329 |
| 7,243,565 B2 | * | 7/2007 | Soeda | .......................... 74/329 |
| 7,267,022 B2 | * | 9/2007 | Gumpoltsberger et al. | .... 74/331 |

FOREIGN PATENT DOCUMENTS

JP 2004-306646 11/2004

* cited by examiner

*Primary Examiner*—David D. Le
(74) *Attorney, Agent, or Firm*—Carrier, Blackman & Associates, P.C.; William D. Blackman; Joseph P. Carrier

(57) ABSTRACT

A vehicular transmission has a structure which enables a reverse idle gear to absorb and reduce excessive back torque inputted from drive wheels. At the time of reverse traveling motion, a counter shaft and a reverse gear are connected to each other through the intermediation of a clutch mechanism, whereby the power of the counter shaft is transmitted from the reverse gear, a driven gear, a hollow shaft, and a drive gear to the drive shaft by way of a final gear. When a large back torque is inputted to the final gear from the drive shaft, the inputted back torque is transmitted to the drive gear, and is then further transmitted to the driven gear by way of the hollow shaft. Since the hollow shaft is thin-walled and has reduced rigidity, it undergoes circumferential twisting due to the back torque inputted, whereby the back torque is reduced.

15 Claims, 5 Drawing Sheets

VEHICULAR TRANSMISSION

CROSS-REFERENCE TO RELATED APPLICATIONS

The present invention claims priority under 35 USC 119 based on Japanese patent application No. 2005-101034, filed on Mar. 31, 2005. The subject matter of this priority document is incorporated by reference herein.

BACKGROUND OF THE INVENTION

1. Field of the Invention

The present invention relates to a vehicular transmission, and more particularly to the structure of a vehicular transmission that is equipped with a reverse function.

2. Description of the Background Art

It is well known to provide a vehicle transmission that is capable of reversing the output of the engine. JP-A No. 306646/2004 discloses a vehicle having a transmission equipped with a reverse function. In this disclosure a driven gear to which engine power is inputted, and a drive gear for outputting the engine power, are integrally provided on a reverse idle shaft. The engine power that is inputted to the driven gear of the reverse idle shaft from a counter shaft is transmitted from the drive gear to a drive shaft at the time of reverse traveling motion.

FIGS. 4 and 5 are sectional views showing the construction of a conventional reverse idle gear. In the example of FIG. 4, a drive gear 51 for outputting engine power is spline-coupled to a sleeve portion 53 of a driven gear 52 to which the engine power is inputted. In the example of FIG. 5, a driven gear 55, to which engine power is inputted, is formed integrally with a drive gear 54 for outputting the engine power.

In the prior art as described above, back torque inputted to the drive shaft from the drive wheels is transmitted to the reverse idle gear without being reduced. Accordingly, the prior art configurations are subject to the technical problem in which the portions around the reverse idle gear must be imparted with a strength that is sufficient to withstand the back torque, leading to an increase in the size or weight of the transmission.

It is an object of the present invention to solve the above-mentioned problem of the prior art and to provide a vehicular transmission having a structure capable of reducing an inputted back torque without leading to an increase in the size or weight of the transmission.

SUMMARY

The characteristic features of the present invention reside in adopting the following structure for a vehicular transmission that is equipped with a reverse function in order to attain the above-mentioned object of the present invention.

A first aspect of the invention is directed to a transmission structure that includes a reverse idle gear. The reverse idle gear includes a driven gear to which drive force is inputted, and a drive gear for outputting the drive force. The reverse idle gear also includes a hollow shaft. The driven gear is fixed to one end of the hollow shaft, and the drive gear is fixed to the other end of the hollow shaft. In addition, an idle shaft pivotally supports the hollow shaft According to the first aspect of the invention, even when back torque is inputted to the drive gear of the reverse idle gear, the back torque can be reduced since the hollow shaft of the reverse idle gear undergoes twisting between the drive gear and the driven gear, thereby making it possible to accommodate the back torque without increasing the strengths of the reverse idle gear and portions in the vicinity thereof.

A second aspect of the invention is directed to the transmission structure as described above with respect to the first aspect, and is further characterized in that a portion of the hollow shaft formed to be more thin than other portions thereof.

According to the second aspect of the invention, a portion of the hollow shaft of the reverse idle gear is formed to be more thin than other portions thereof, which makes it possible for the hollow shaft to undergo a large deformation upon occurrence of strong back torque while retaining a rigidity sufficient to support the drive gear and the driven gear, thereby enabling a reduction in back torque.

A third aspect of the invention is directed to the transmission structure as described above with respect to either the first aspect or the second aspect, and is further characterized in that one of the driven gear and the drive gear is formed integrally with the hollow shaft.

According to the third aspect of the invention, the number of components of the reverse idle gear can be reduced.

Modes for carrying out the present invention are explained below by reference to an embodiment of the present invention shown in the attached drawings. The above-mentioned object, other objects, characterstics and advantages of the present invention will become apparent form the detailed description of the embodiment of the invention presented below in conjunction with the attached drawings.

DETAILED DESCRIPTION

A selected illustrative embodiment of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art.

Figure 1:
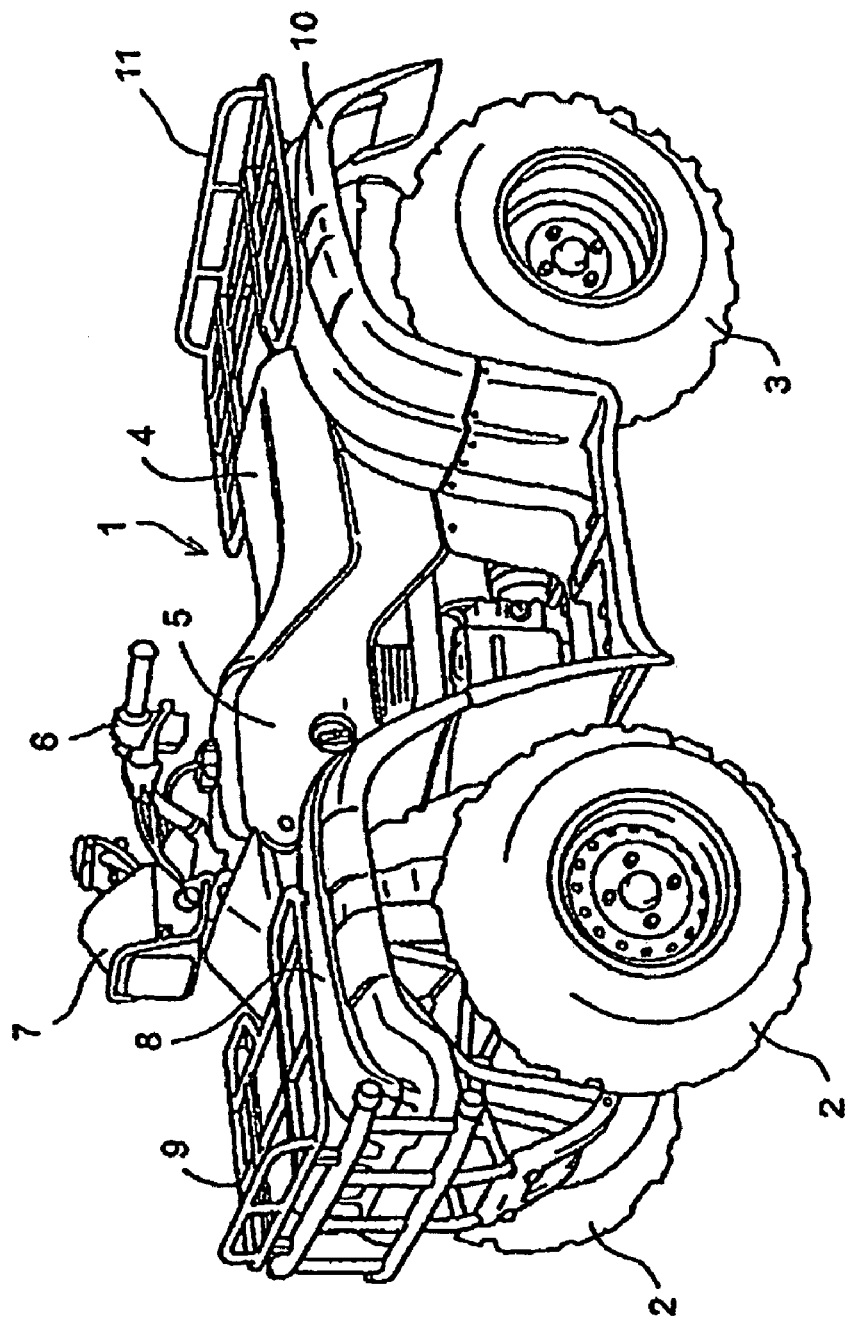
FIG. 1 is a front perspective view of an all terrain vehicle to which a vehicular transmission according to the present invention is mounted.

FIG. 1 is a perspective view of an all terrain vehicle (ATV) 1 mounted with a vehicular transmission according to the present invention. The transmission is equipped with a reverse function.

The ATV 1 has front wheels 2 and rear wheels 3, and each wheel 2, 3, is equipped with a large-diameter balloon tire. The ATV 1 also has a seat 4 arranged between the front and rear wheels, and a fuel tank 5 arranged in front of the seat 4. A handlebar 6 is provided in front of the fuel tank 5, with an instrument panel box 7 being provided at the central portion of the handlebars 6. The portion of the ATV 1 in front of the handlebars 6 is covered with a front fender 8. Provided above the front fender 8 is a front carrier 9 on which goods are loaded. On the rear wheel 3 side of the ATV 1, there are provided a rear fender 10 and a rear carrier 11 situated above the rear fender 10. An engine and a four wheel drive mechanism for transmitting the power of the engine to the front wheels 2 and the rear wheels 3 are disposed below the seat 4.

Figure 2:
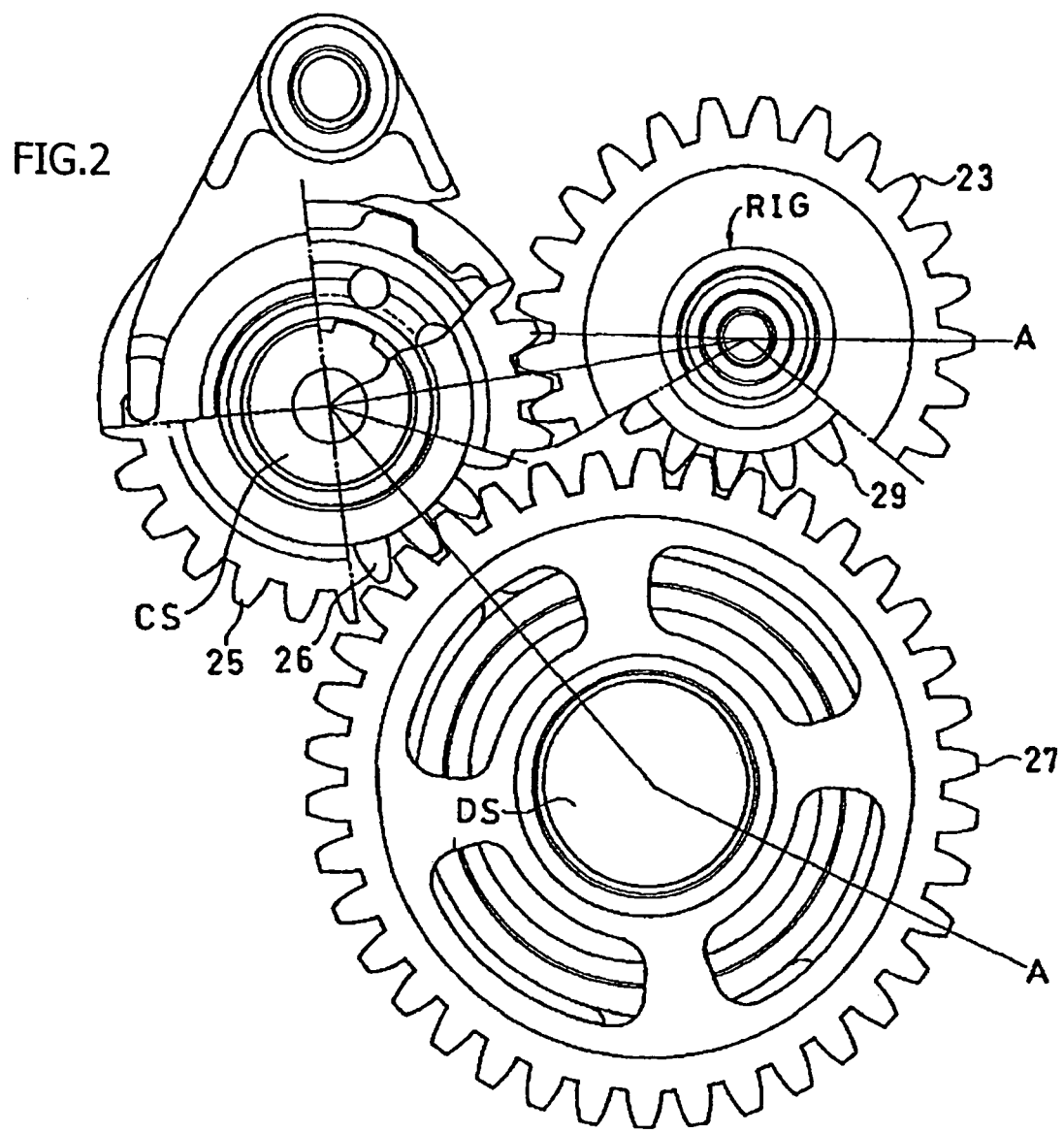
FIG. 2 is a side view of the vehicular transmission according to the present invention showing the vicinity of a reverse mechanism.
Figure 3:
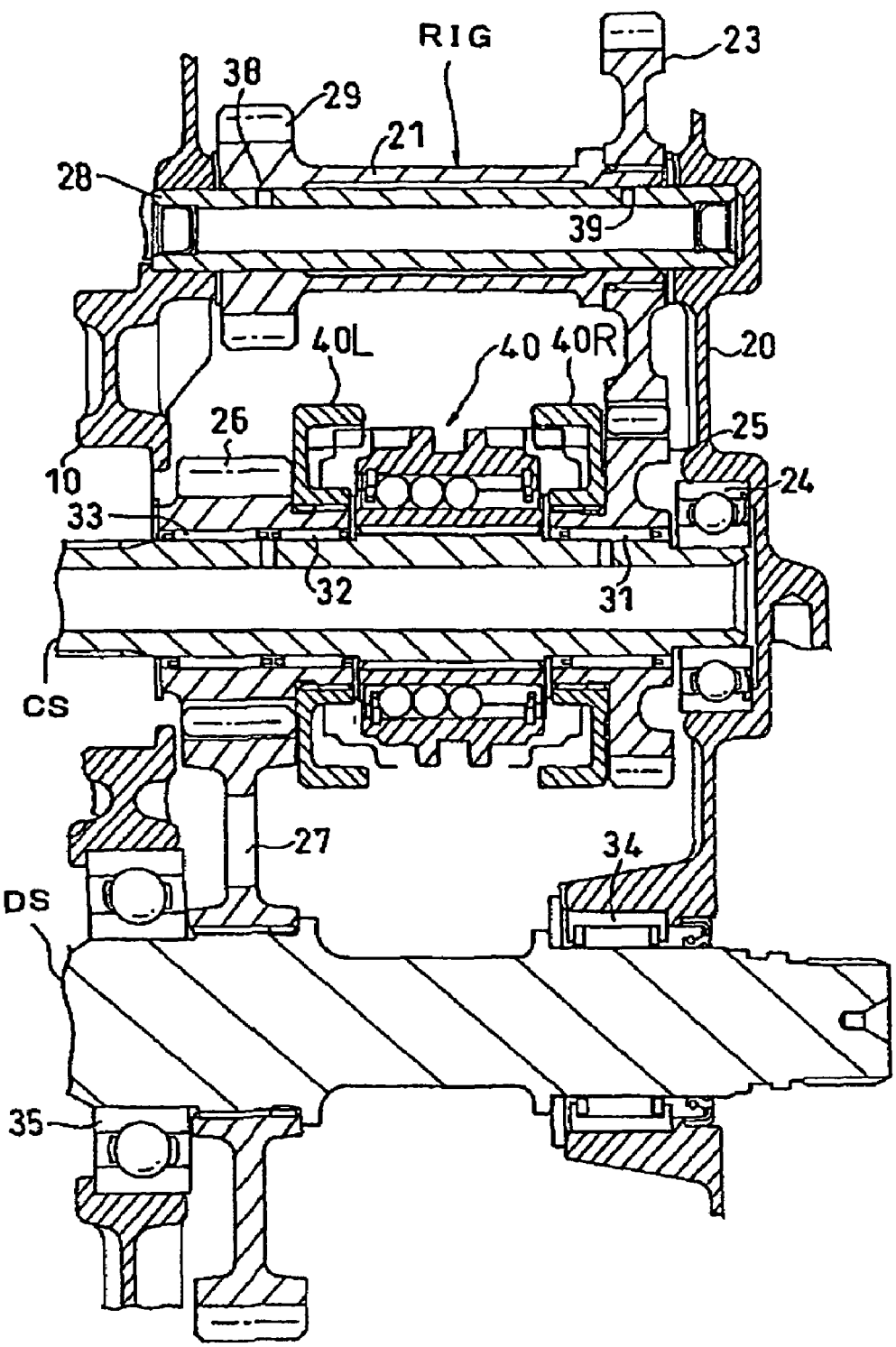
FIG. 3 is a sectional view of the vehicular transmission according to the present invention taken along the line A-A of FIG. 2

FIG. 2 is a side view of a vehicular transmission adopted for the ATV 1 showing the vicinity of a reverse mechanism, and FIG. 3 is a sectional view taken along the line A-A of FIG. 2. The description will now be focused on a counter shaft CS rotated by the engine power, a drive shaft DS connected to a propeller shaft, and a reverse idle gear RIG that is brought into meshing engagement with and between the respective shafts CS and DS at the time of reverse traveling motion.

Figure 3A:
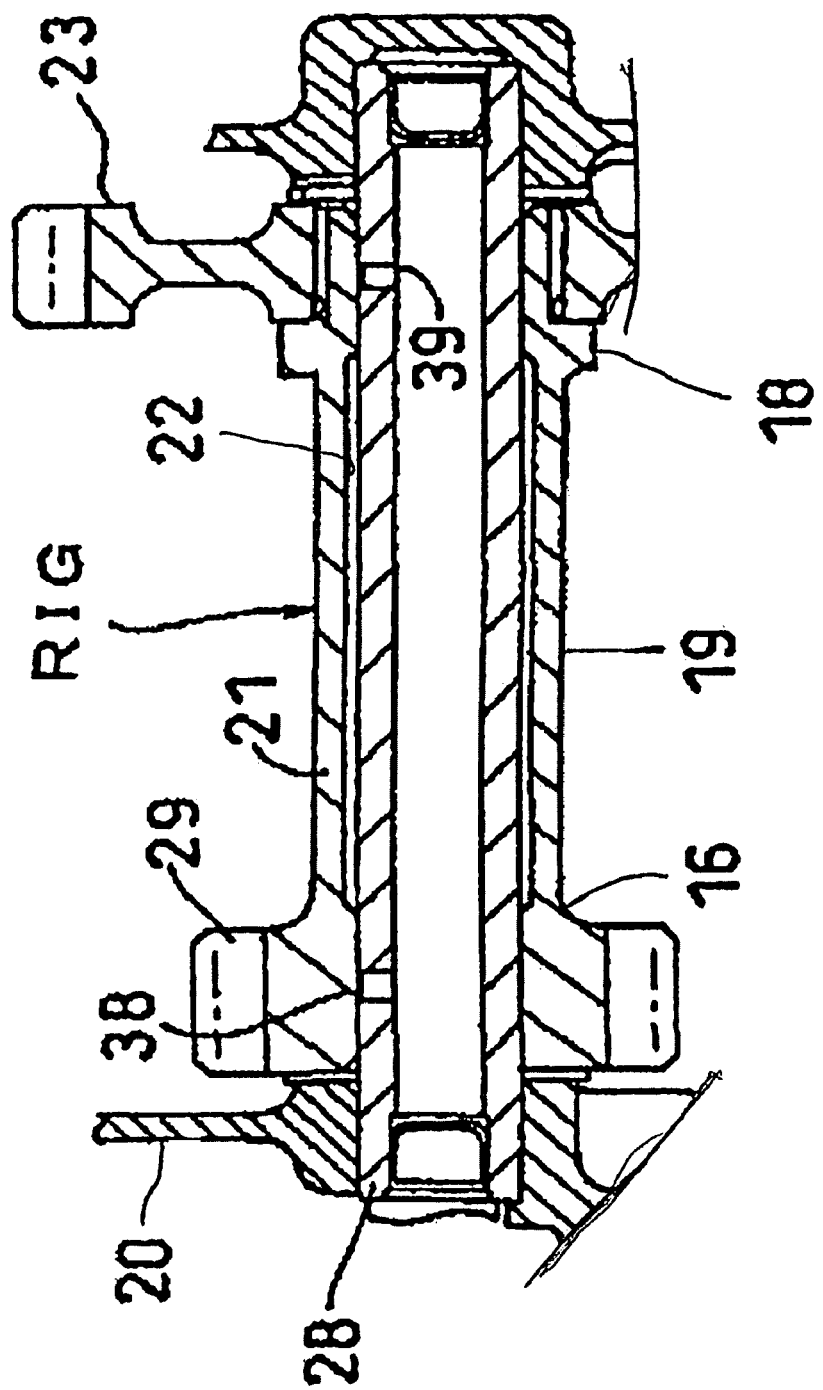
FIG. 3A is an enlarged detail view of an upper portion of FIG. 3.
Figure 4:
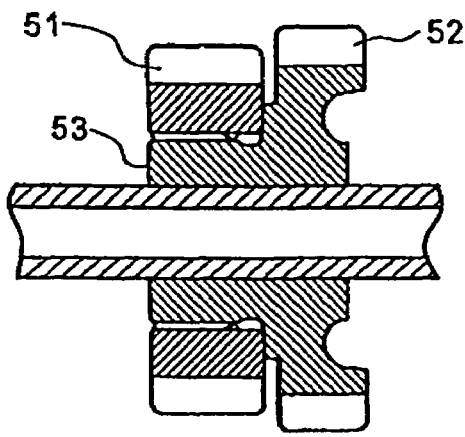
FIG. 4 is a sectional view showing the construction of one embodiment of a conventional reverse idle gear, showing a spline connection between the drive gear and the driven gear of the reverse idle gear.
Figure 5:
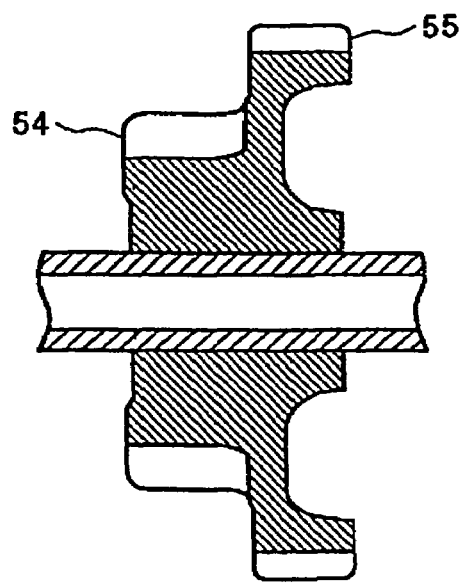
FIG. 5 is a sectional view showing the construction of another embodiment of a conventional reverse idle gear, showing the drive gear and driven gear as integrally formed.

The reverse idle gear RIG is constructed by rotatably placing a thin-walled hollow shaft 21 around an idle shaft 28 whose ends are rotatably supported by a casing 20. The hollow shaft 21 is coaxial with the idle shaft 28, and the hollow shaft 21 is provided with a length such that the hollow shaft 21 extends fully across the space between opposed supporting sidewalls of the casing 20. As seen best in FIG. 3A, the hollow shaft 21 includes a first end portion 16 having an inner surface in contact with the outer surface of the idle shaft 28, a second end portion 18 having an inner surface in contact with the outer surface of the idle shaft 28, and a mid portion 19 interconnecting the first and second ends 16, 18. The mid portion 19 of the hollow shaft 21 is spaced away from the idle shaft 28 so as to form an empty space 22 therebetween, as shown. The hollow shaft 21 is in contact with the outer surface of the idle shaft 28 only at both end portions 16, 18 and the mid portion 19 of the hollow shaft 21, that is, the portion of the shaft other than the end portions 16, 18, has a wall thickness that is more thin than the wall thickness at both end portions. In addition, the mid portion 19 of the hollow shaft is elongated, having a length that is, for example, approximately twice the outer diameter thereof.

A drive gear 29 is formed integrally with one end of the hollow shaft 21, and a driven gear 23 is spline-coupled to the other end of the hollow shaft 21. The idle shaft 28 has oil passages 38 and 39 formed at positions where the idle shaft 28 pivotally supports the hollow shaft 21.

The counter shaft CS is pivotally supported in a rotatable manner with respect to the casing 20 by means of a plurality of bearing members including a ball bearing 24. A reverse gear 25, which is in constant meshing engagement with the driven gear 23 of the reverse idle gear RIG, and a final drive gear 26 are pivotally supported in a rotatable manner with respect to the counter shaft CS through the intermediation of a needle bearing 31 and two needle bearings 32 and 33, respectively. Further mounted to the counter shaft CS is a clutch mechanism 40. The clutch mechanism 40 is arranged between the reverse gear 25 and the final drive gear 26, and selectively couples the respective gears 25 and 26 to the counter shaft CS.

The drive shaft DS is pivotally supported in a rotatable manner with respect to the casing 20 by means of a plurality of bearing members including a needle bearing 34 and a ball bearing 35. A final drive gear 27, which is in constant meshing engagement with the final drive gear 26 of the counter shaft CS, is spline-coupled to the drive shaft DS. Further, the final gear 27 is held in constant meshing engagement with the drive gear 29 of the reverse idle gear RIG At the time of forward traveling motion of the vehicle, the clutch mechanism 40 is moved by a shifter (not shown) in the leftward direction in FIG. 3 whereby it becomes coupled with a shifter guide 40L, so that the counter shaft CS and the final drive gear 26 are connected to each other through the intermediation of the clutch mechanism 40. Accordingly, the power of the counter shaft CS is transmitted from the final drive gear 26 to the drive shaft DS by way of the final gear 27, and is then further transmitted to the drive wheels by way of a propeller shaft (not shown).

In contrast, at the time of reverse traveling motion, the clutch mechanism 40 is moved in the rightward direction in FIG. 3 whereby it becomes coupled with a shifter guide 40R, so that the counter shaft CS and the reverse gear 25 are connected to each other through the intermediation of the clutch mechanism 40. Accordingly, the power of the counter shaft CS is transmitted firm the reverse gear 25, the driven gear 23, the hollow shaft 21, and the drive gear 29 to the drive shaft DS by way of the final gear 27, and is then further transmitted to the drive wheels by way of the propeller shaft (not shown).

In the vehicular transmission constructed as described above, when large back torque is inputted from the drive shaft DS to the final gear 27 during reverse traveling motion, the inputted back torque is transmitted to the drive gear 29 and then further transmitted to the drive gear 23 by way of the hollow shaft 21.

However, in this embodiment, since the hollow shaft 21 has a thin-walled structure and has reduced rigidity, the back torque inputted to the drive gear 29 causes the hollow shaft 21 to undergo circumferential twisting, thereby making it possible to reduce the back torque. Therefore, it becomes possible to accommodate an excessive input of back torque without increasing the strengths of the reverse idle gear RIG and of the components around the same.

While a working example of the present invention has been described above, the present invention is not limited to the working example described above, but various design alterations maybe carried out without departing from the present invention as set forth in the claims.

What is claimed is:

1. A vehicular transmission comprising an idle shaft, and a reverse idle gear mounted on the idle shaft, wherein the reverse idle gear comprises:
a driven gear through which a drive force is inputted to the reverse idle gear;
a drive gear for outputting the drive force from the reverse idle gear; and
a hollow shaft pivotally supported on the idle shaft, the hollow shaft comprising a first end portion having an inner surface in contact with an outer surface of the idle shaft, a second end portion having an inner surface in contact with the outer surface of the idle shaft, and a mid portion interconnecting the first and second ends,
wherein the driven gear is fixed to one end of the hollow shaft, and the drive gear is fixed to the other end of the hollow shaft,
and wherein the mid portion of the hollow shaft is spaced away from the idle shaft so as to form an empty space therebetween.

2. The vehicular transmission according to claim 1, wherein a portion of the hollow shaft is formed to be more thin than other portions thereof.

3. The vehicular transmission according to claim 1, wherein at least one of the driven gear and the drive gear is formed integrally with the hollow shaft.

4. The vehicular transmission according to claim 1, wherein:
the axial length of the mid portion is longer than the outer diameter of the hollow shaft, and
the wall thickness of the mid portion is less than the wall thickness of the end portions thereof.

5. The vehicular transmission according to claim 1, wherein the hollow shaft is in contact with the outer surface of the idle shaft only at both end portions of the hollow shaft, and the portion of the hollow shaft other than the end portions is formed to be more thin than the end portions.

6. The vehicular transmission according to claim 1, wherein the hollow shaft and idle shaft are disposed coaxially.

7. A vehicular transmission, the transmission comprising:
a casing comprising a pair of opposed sidewalls;
an idle shaft rotatably supported on the opposed sidewalls, the idle shaft comprising a reverse idle gear mounted thereon;
a drive shaft rotatably supported on the opposed sidewalls, the drive shaft comprising a final gear connected to the reverse idle gear; and
a counter shaft rotatably supported on the opposed sidewalls, the counter shaft comprising a first gear, a second gear, and a clutch mechanism which selectively connects one of the first and second gear to the counter shaft, the first gear connected to the final gear of the drive shaft, the second gear connected to the reverse idle gear;
wherein the reverse idle gear comprises:
a driven gear through which a drive force is inputted to the reverse idle gear, the driven gear connected to the second gear of the counter shaft;
a drive gear for outputting the drive force from the reverse idle gear, the drive gear connected to the final gear of the drive shaft; and
a hollow shaft pivotally supported on the idle shaft, the hollow shaft comprising a first end portion having an inner surface in contact with an outer surface of the idle shaft, a second end portion having an inner surface in contact with the outer surface of the idle shaft, and a mid portion interconnecting the first and second ends,
wherein the driven gear is fixed to one end of the hollow shaft, and the drive gear is fixed to the other end of the hollow shaft, and
wherein the mid portion of the hollow shaft is spaced away from the idle shaft so as to form an empty space therebetween.

8. The vehicular transmission according to claim 7, wherein a portion of the hollow shaft is formed to be more thin than other portions thereof.

9. The vehicular transmission according to claim 7, wherein one of the driven gear and the drive gear is formed integrally with the hollow shaft.

10. The vehicular transmission according to claim 7, wherein the wall thickness of the mid portion is less than the wall thickness of the end portions thereof.

11. The vehicular transmission according to claim 7, wherein:
the axial length of the mid portion is longer than the outer diameter of the hollow shaft, and
the wall thickness of the mid portion is less than the wall thickness of the end portions thereof.

12. The vehicular transmission according to claim 7, wherein the hollow shaft is in contact with the outer surface of the idle shaft only at both end portions of the hollow shaft, and the portion of the hollow shaft other than the end portions is formed to be more thin than the end portions.

13. The vehicular transmission according to claim 7, wherein the hollow shaft and the idle shaft are disposed coaxially.

14. The vehicular transmission according to claim 7, wherein the hollow shaft has a length such that the hollow shaft extends fully across the space between the opposed sidewalls of the casing.

15. The vehicular transmission according to claim 14, wherein the hollow shaft is in contact with the outer surface of the idle shaft only at end portions of the hollow shaft adjacent to the opposed sidewalls, and the portion of the hollow shaft other than the end portions is formed to be more thin than the end portions.

* * * * *